United States Patent [19]

Bardsley et al.

[11] 4,354,815
[45] Oct. 19, 1982

[54] APPARATUS FOR THE PREPARATION OF A FOOD PRODUCT

[75] Inventors: Robert F. Bardsley, Harrington Park, N.J.; Jonas Bortkevicius, Woodhaven, N.Y.; Charles D. Schoonmaker, Boonton, N.J.

[73] Assignee: General Foods Corporation, White Plains, N.Y.

[21] Appl. No.: 74,730

[22] Filed: Sep. 12, 1979

Related U.S. Application Data

[62] Division of Ser. No. 914,046, Jun. 9, 1978, Pat. No. 4,195,559.

[51] Int. Cl.³ .............................................. B29J 1/00
[52] U.S. Cl. ...................................... 425/236; 425/233; 425/340; 425/342.1; 425/347; 425/348 R; 425/348 S; 425/350
[58] Field of Search ............... 425/340, 342.1, 233, 425/236, 347, 348 R, 348 S, 350

[56] References Cited

U.S. PATENT DOCUMENTS

| | | | |
|---|---|---|---|
| 1,848,712 | 3/1932 | Hanns | 425/340 |
| 3,091,808 | 6/1963 | Dakin | 425/342.1 |
| 3,520,248 | 7/1970 | MacKendrick | 99/404 |
| 3,841,820 | 10/1974 | Vedvik | 425/342.1 |
| 3,905,285 | 9/1975 | Campbell | 99/353 |
| 3,911,805 | 10/1975 | Baird | 425/304 |

Primary Examiner—James H. Derrington

Attorney, Agent, or Firm—Daniel J. Donovan; Thomas R. Savoie; Thomas V. Sullivan

[57] ABSTRACT

An apparatus and method for the automatic, rapid and continuous preparation of generally friable or fragile ready-to-eat food product bacon analog strips of predetermined configuration, simulating natural, cooked bacon, wherein a slab or bulk material of the food product is sliced by a cutting device into individual strips basically having the dimensions of sliced natural bacon strips, and conducted by means of a first endless conveyor arrangement from the cutting device towards a cooking installation. Ahead of the cooking installation, a second endless conveyor mounts a series of strip-engaging members adapted to sequentially contact the sliced strips and to conduct the strips from the first endless conveyor arrangement onto and along guide rod members which extend into and through the cooking installation. The strips are fried or cooked at a controlled temperature to a finished degree, determined by the speed of movement through the tank, and are thereafter guided into position on forming die members which are arranged about the periphery of a rotatable forming die wheel. Complementary-shaped die members arranged on each of the strip-engaging members are brought into closely spaced cooperation with the forming dies on the rotatable forming die wheel through the action of a camming arrangement encompassing a portion of the periphery of the forming wheel so as to shape the interposed bacon analog strips into their predetermined configurations.

7 Claims, 16 Drawing Figures

APPARATUS FOR THE PREPARATION OF A FOOD PRODUCT

This is a division of application Ser. No. 914,046, filed June 9, 1978, now U.S. Pat. No. 4,195,559.

BACKGROUND OF THE INVENTION

1. Field of the Invention

The present invention relates, in general, to an apparatus and method for the preparation of a food product and, more particularly, relates to an apparatus and method for the automatic and continuous preparation of friable or fragile strips of a food product having a predetermined configuration, such as a bacon analog product.

In recent years considerable effort has been expended by the food processing industry in the development of new apparatuses and methods which are applicable to the production of various types of meat-like, protein-containing foods from various vegetable and animal protein sources. Primary consideration has been given to economics, inasmuch as the production of meat by animals is inefficient, whereas it is more efficient and economically feasible to directly utilize vegetable materials in the human diet to at least partially provide viable substitutes for meat. In order to meet the demand for such meat substitutes through the employment of readily available and generally inexpensive vegetable materials, there have been developed meat analogs which will provide synthetic products incorporating textures, appearances, and flavors which are equivalent to natural meat products.

In particular, the production of meat substitutes in the form of bacon analogs proved a promising facet of this technology, reaching the point wherein the preparation of bacon-like products constituted essentially of vegetable and animal protein sources became suitable for extensive and economically feasible commercial exposure.

Although some earlier U.S. Pat. Nos. described commercial bacon analogs or meat substitutes, such as Hartman 3,320,070, Corliss et al 3,930,033, and Leidy et al 3,840,677, further need for improvement for commercial success was apparent. Some of these did not fully meet the requirements in providing the necessary shelf life or crispness desired in bacon when positioned proximate a moist ingredient. Moreover, some of the meat substitutes are available to the consumer only in a semi-processed state, in effect, requiring additional preparation, such as cooking or frying, before being rendered suitable for consumption.

More recently, there has been developed a bacon analog product which is highly resistant to moisture and rough handling and which, in addition to affording an extended shelf life, encompasses therein all of the desirable properties and appearances of natural bacon although it is constituted of bacon analog formed from various vegetable and animal protein sources. Furthermore, the bacon analog product is available to the consumer in a ready-to-eat condition, thus obviating the need for further processing, such as cooking or frying, and thereby rendering it highly attractive from a consumer viewpoint. This bacon analog product and process is described in copending U.S. patent application No. 622,272; filed Oct. 10, 1975, now U.S. Pat. No. 4,104,415; for Bacon Analog Product and Process, and which is assigned to the common assignee for this application.

2. Discussion of the Prior Art

Although numerous apparatuses and processes have in the past been proposed and developed for the production and processing of various types of food products, such as potato chips as disclosed in Pringle U.S. Pat. No. 2,286,644, Crommelijnck 3,736,862 and Baird 3,911,805; or enchiladas and the like as disclosed in Jimenez 3,901,137 and Baird 3,911,805; no apparatus or method has hitherto been developed which will provide for the automatic, rapid and continuous preparation of essentially ready-to-eat friable or fragile strips of a food product of predetermined configuration, such as a bacon analog or the like, from a slab or bulk source of the semi-processed food product material, and which is adapted to meet the demands of mass marketing and consumer appeal in an economic manner.

SUMMARY OF THE INVENTION

Accordingly, it is a principal object of the present invention to provide an apparatus for the automatic, rapid preparation in a continuous manner of generally friable or fragile strips of a generally ready-to-eat food product of predetermined configuration, such as a bacon analog or the like.

Another object of the present invention is to provide an apparatus of the above-mentioned type which will provide for the rapid and automatic production of ready-to-consume bacon analog food product strips produced from semi-processed slabs or bulk material of the food product.

Still another object of the present invention contemplates the provision of an apparatus of the above-mentioned type which, in a high-speed manner, will continually provide consumable strips of bacon analog from a slab of the semi-processed food product material by continuously and sequentially slicing strips of predetermined thickness and size from the slab, incorporating structure for sequentially conveying the strips into and through a cooking tank containing a hot cooking medium for effecting the uniform and controlled cooking or frying thereof, and thereafter subjecting the cooked strips to a concurrent forming and cooling operation through the intermediary of cooperating forming dies as they are rotated about a rotatable die forming wheel in order to impart a predetermined natural cooked bacon-simulating configuration to each strip.

A further object of the present invention lies in the provision of a method for preparing generally friable or fragile strips of a ready-to-eat bacon analog food product of predetermined configuration, through the intermediary of continually slicing strips from slab or bulk of the semi-processed food product material sequentially conveying the strips through a cooking installation containing a cooking medium adapted to uniformly and controllably cook or fry the strips, and subsequently forming the cooked strips between cooperative forming dies into a predetermined configuration while concurrently cooling the strips so as to thereby produce a cooked, ready-to-eat bacon analog product having the appearance, texture and taste of natural, cooked bacon.

In summation, the foregoing and other objects of the present invention are realized through the provision of a novel and unique apparatus for the automatic, rapid and continuous preparation of generally friable or fragile ready-to-eat food product bacon analog strips of predetermined configuration, simulating natural, cooked bacon, wherein a slab or bulk material of the food product is sliced by a cutting device into individual strips basically having the dimensions of sliced and cooked natural bacon strips, and conducted by means of a first endless conveyor arrangement from the cutting device towards a cooking installation consisting of a tank containing a hot cooking medium, such as a cooking oil. Closely ahead of the inlet to the cooking installation, a second endless conveyor mounts a series of strip-engaging members adapted to sequentially contact the sliced strips and to conduct the strips from the first endless conveyor arrangement onto and along guide rod members which extend into and through the tank containing the cooking oil. The strip-engaging members, when conveyed along a lower run of the second conveyor arrangement, move in spaced relationship above the guide rod members, and include depending pins interdigitating with the guide rod members so as to conduct the strips in contact with their trailing edges through the tank while submerged in the cooking oil. The strips are fried or cooked at a controlled temperature to a finished degree, determined by the speed of movement through the tank, and are thereafter guided into position on forming die members which are arranged about the periphery of a rotatable forming die wheel. As the hot cooked strips are conducted onto the forming dies located on the forming die wheel, complementary-shaped die members arranged on each of the strip-engaging members are brought into closely spaced cooperation with the forming dies on the rotatable forming die wheel through the action of a camming arrangement encompassing a portion of the periphery of the forming wheel, the forming dies and complementary forming dies being movable concurrently by synchronizing the speeds of the second endless conveyor arrangement and that of the forming die wheel, so as to shape the interposed bacon analog strips into their predetermined configuration, namely, a wavilinear form simulating natural cooked bacon strips. At the same time, the bacon analog strips which are shaped between the forming and complementary forming dies are cooled as the forming die wheel rotates to thereby achieve and stabilize their generally friable and fragile physical characteristics and configuration. Thereafter, subsequent to the forming wheel having traversed a predetermined angular displacement, the complementary forming dies on the strip-engaging members which are mounted on the second endless conveyor arrangement are displaced away from the forming dies on the forming die wheel while the strips are retained in contact with the forming dies on the forming die wheel by means of suction air being applied to the surfaces thereof. Upon each of the strips approaching bottom dead center on the rotatable forming die wheel, the suction air is released and, after a further small angular movement of the wheel, pressurized air is imparted to the forming die at the wheel bottom location from interiorly thereof in order to eject the cooked and cooled strips from the forming die wheel, for instance, to deposit them sequentially on a further conveyor which will convey the strips further for additional processing or to a packaging station.

BRIEF DESCRIPTION OF THE DRAWINGS

Other advantages and features of the invention may be more fully understood by one skilled in the art, having reference to a preferred embodiment of an apparatus for the preparation of a food product, such as bacon analog strips, constructed pursuant to the invention, taken in conjunction with the accompanying drawings; in which.

DETAILED DESCRIPTION OF THE INVENTION

Referring now in detail to the drawings, and particularly the overall arrangement of the machine as shown in FIGS. 1a through 1d and 2a through 2d, although the machine as disclosed is adapted for the preparation of bacon analog strips in two parallel extending and concurrently operating production lines, it is described hereinbelow with reference to a single production line.

Figure 1A:
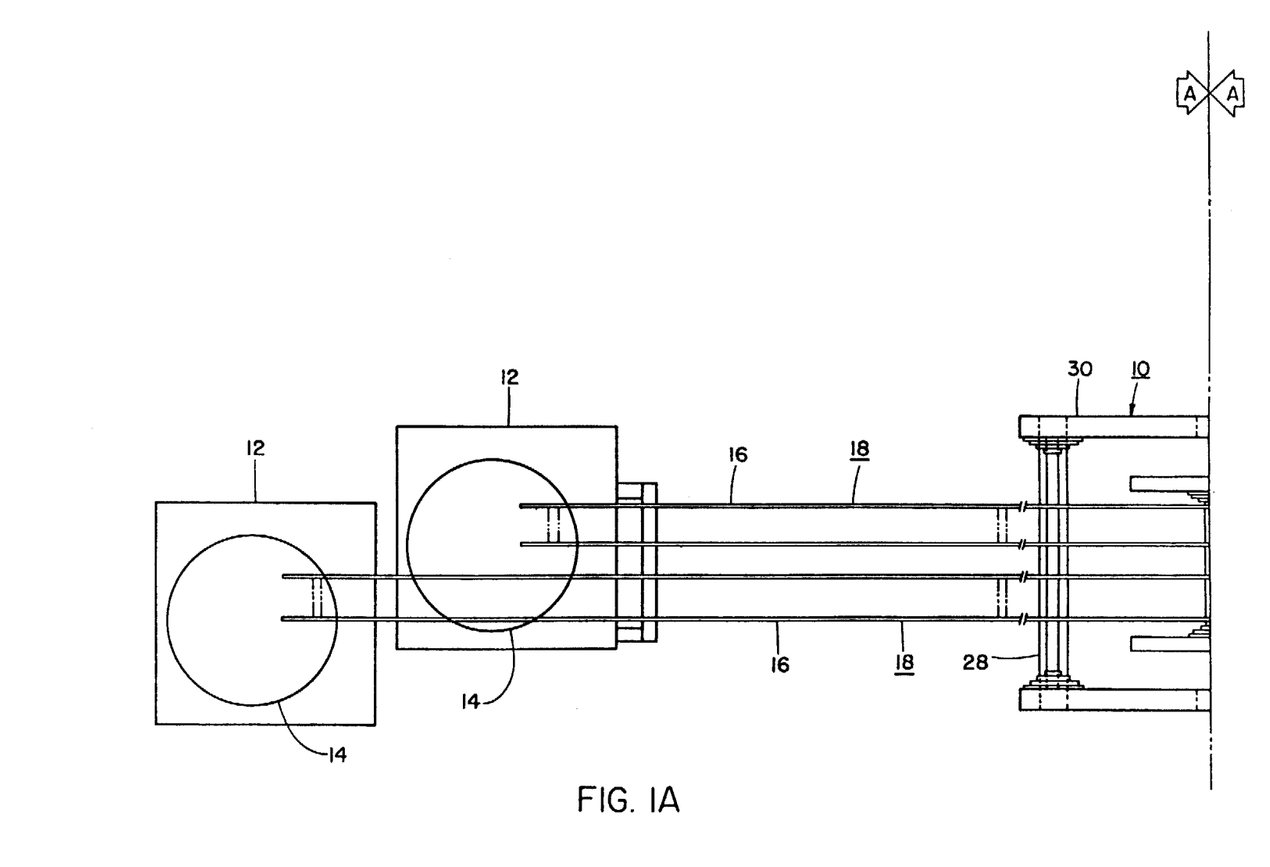
FIGS. 1a through 1d illustrate a generally diagrammatic plan view of an apparatus constructed pursuant to the present invention.
Figure 1B:
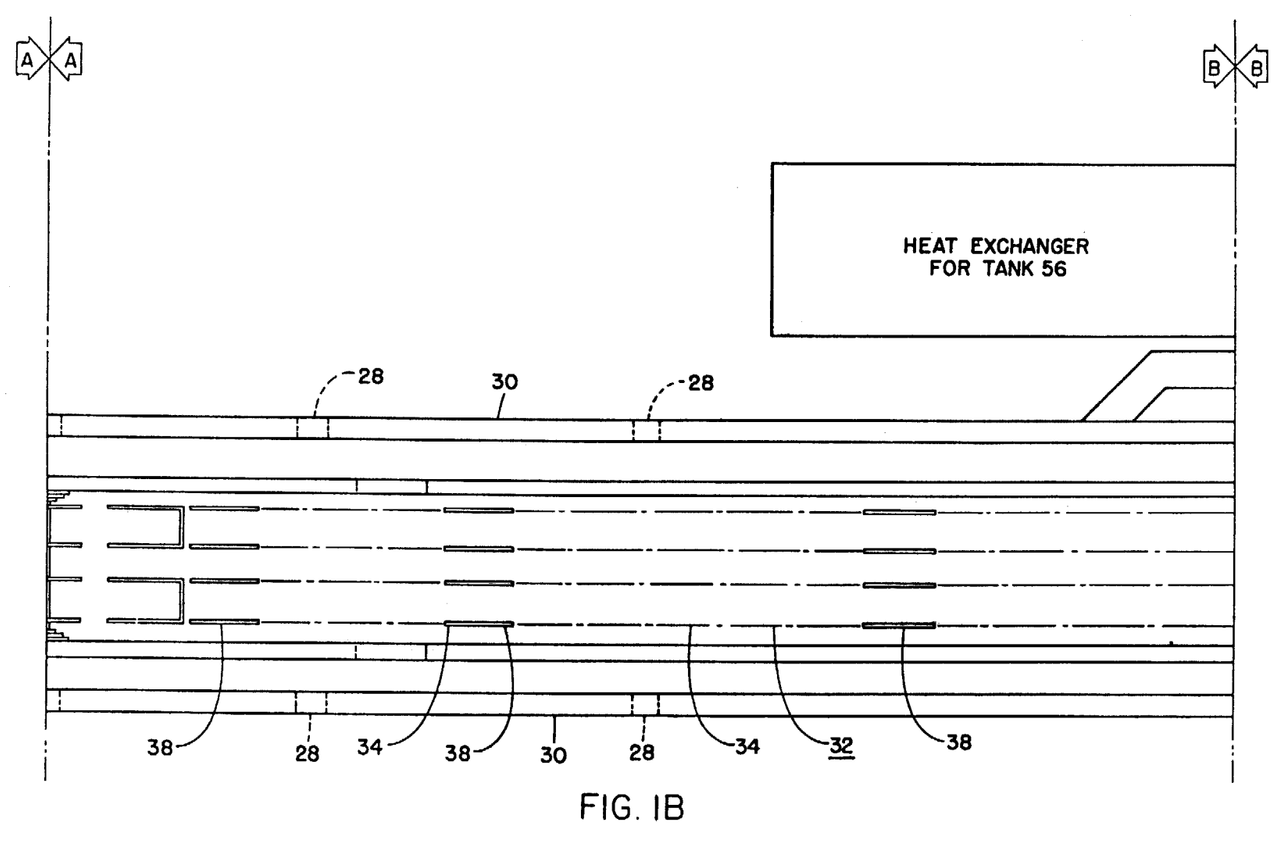
Figure 1C:
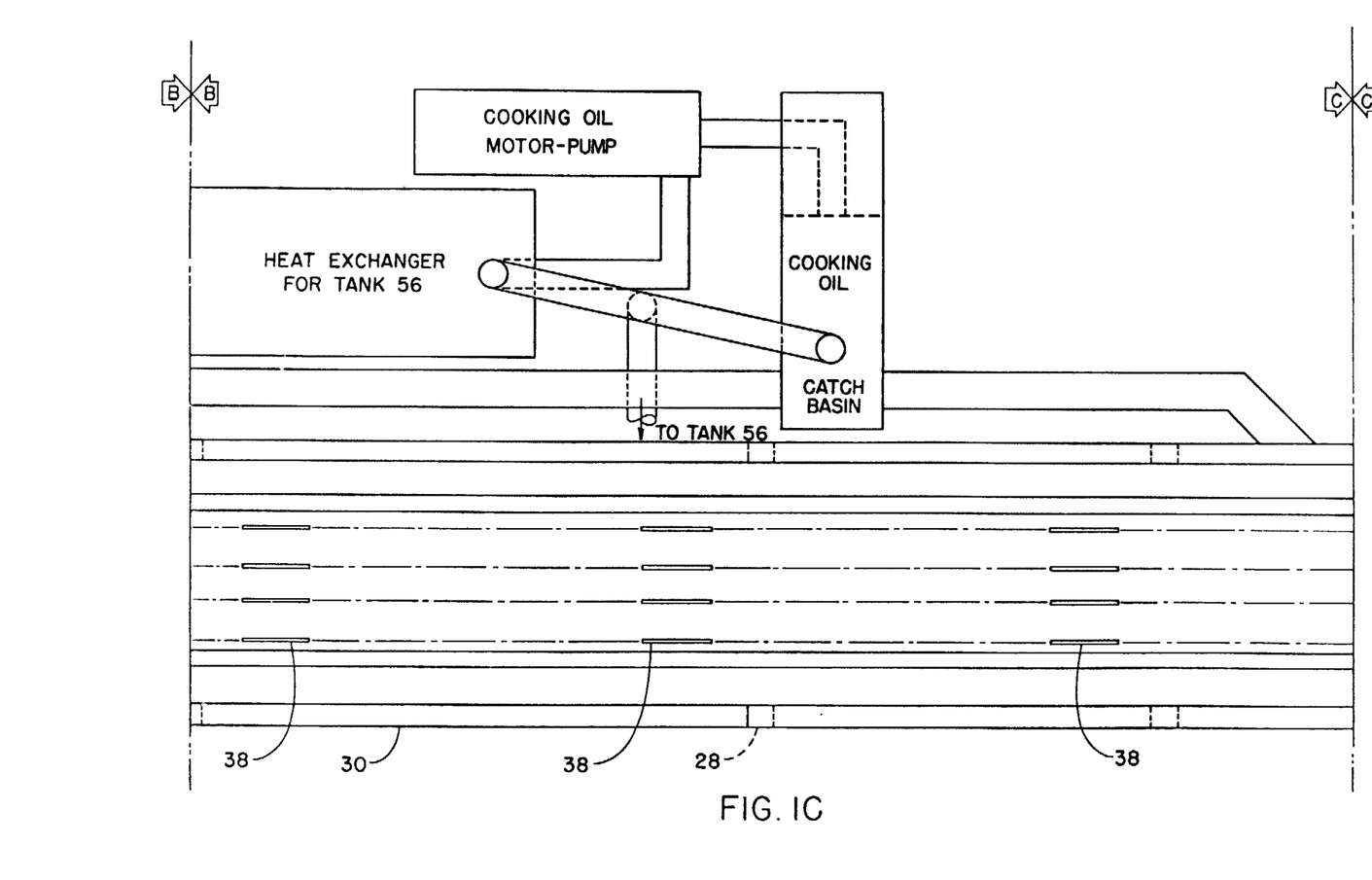
Figure 1D:
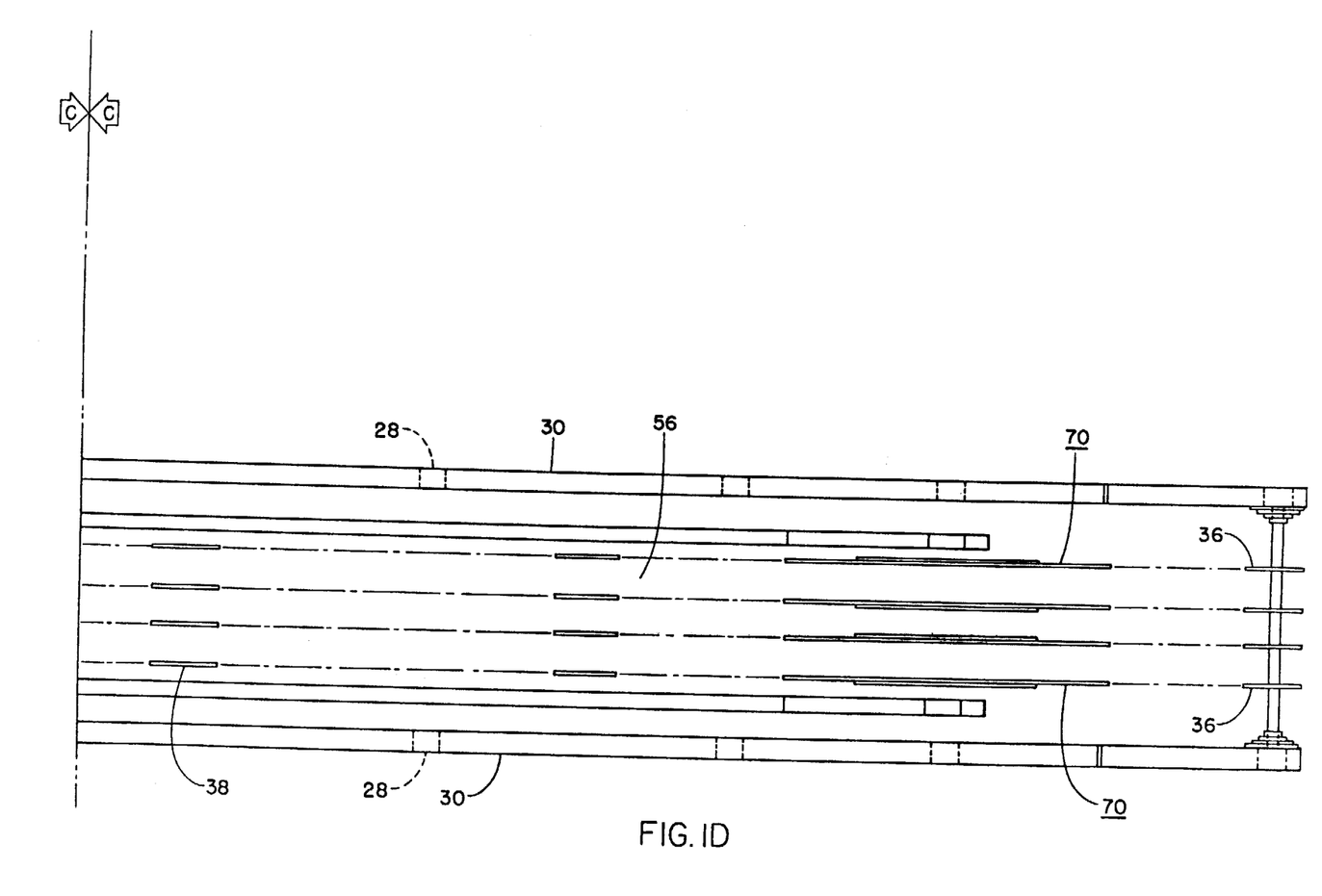
Figure 2A:
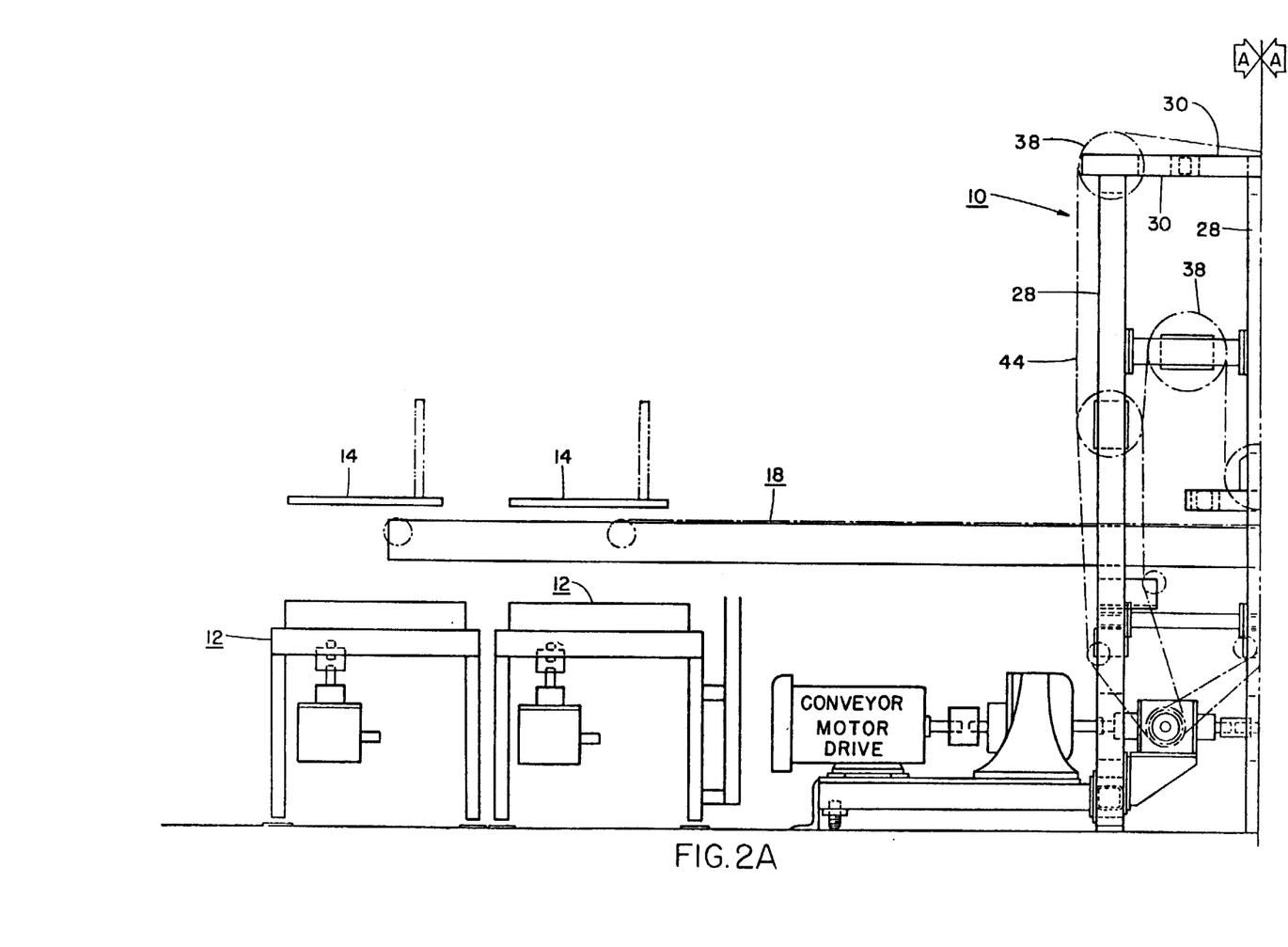
FIGS. 2a through 2d illustrate an elevational side view of the apparatus of FIGS. 1a through 1d.
Figure 2B:
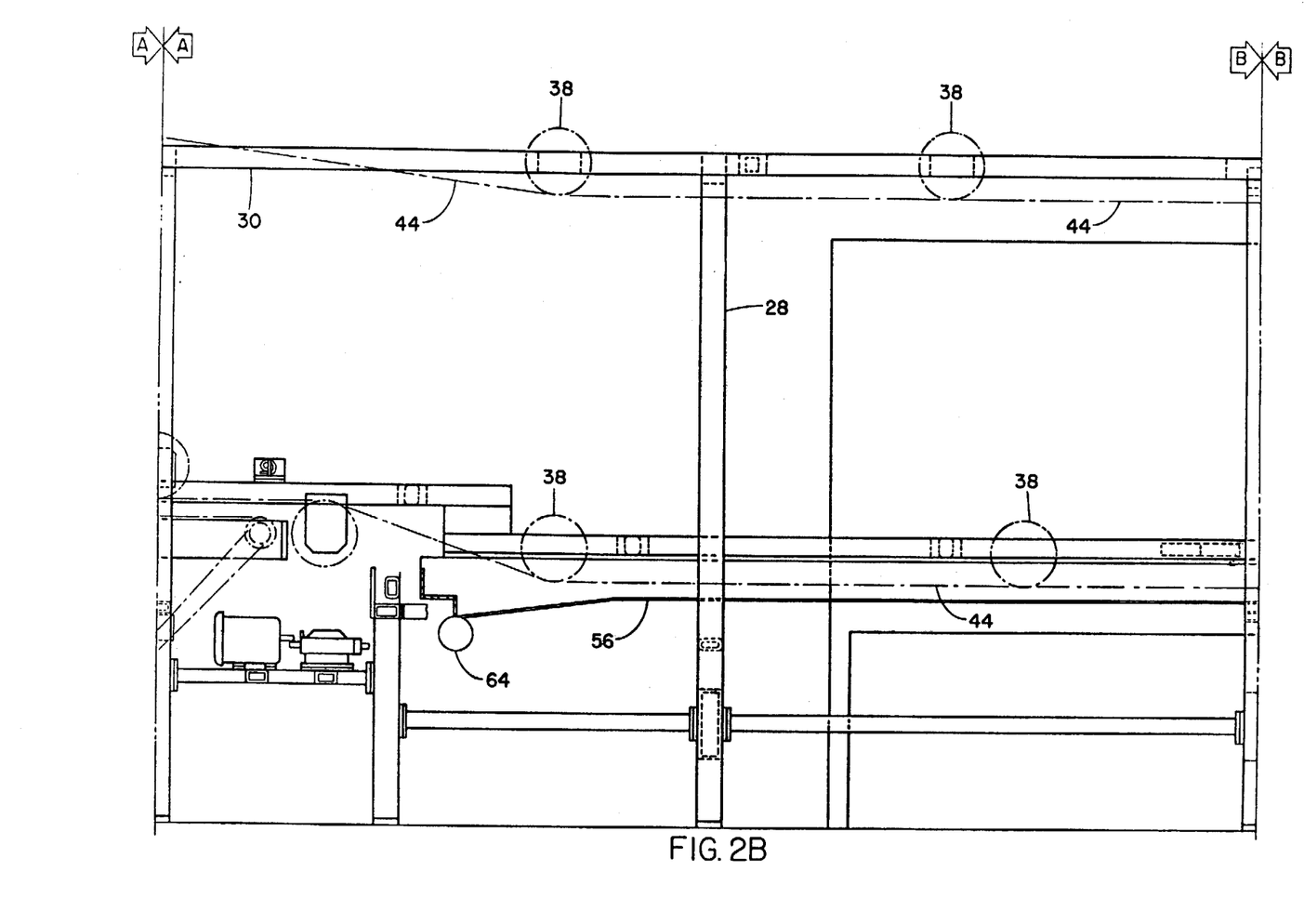
Figure 2C:
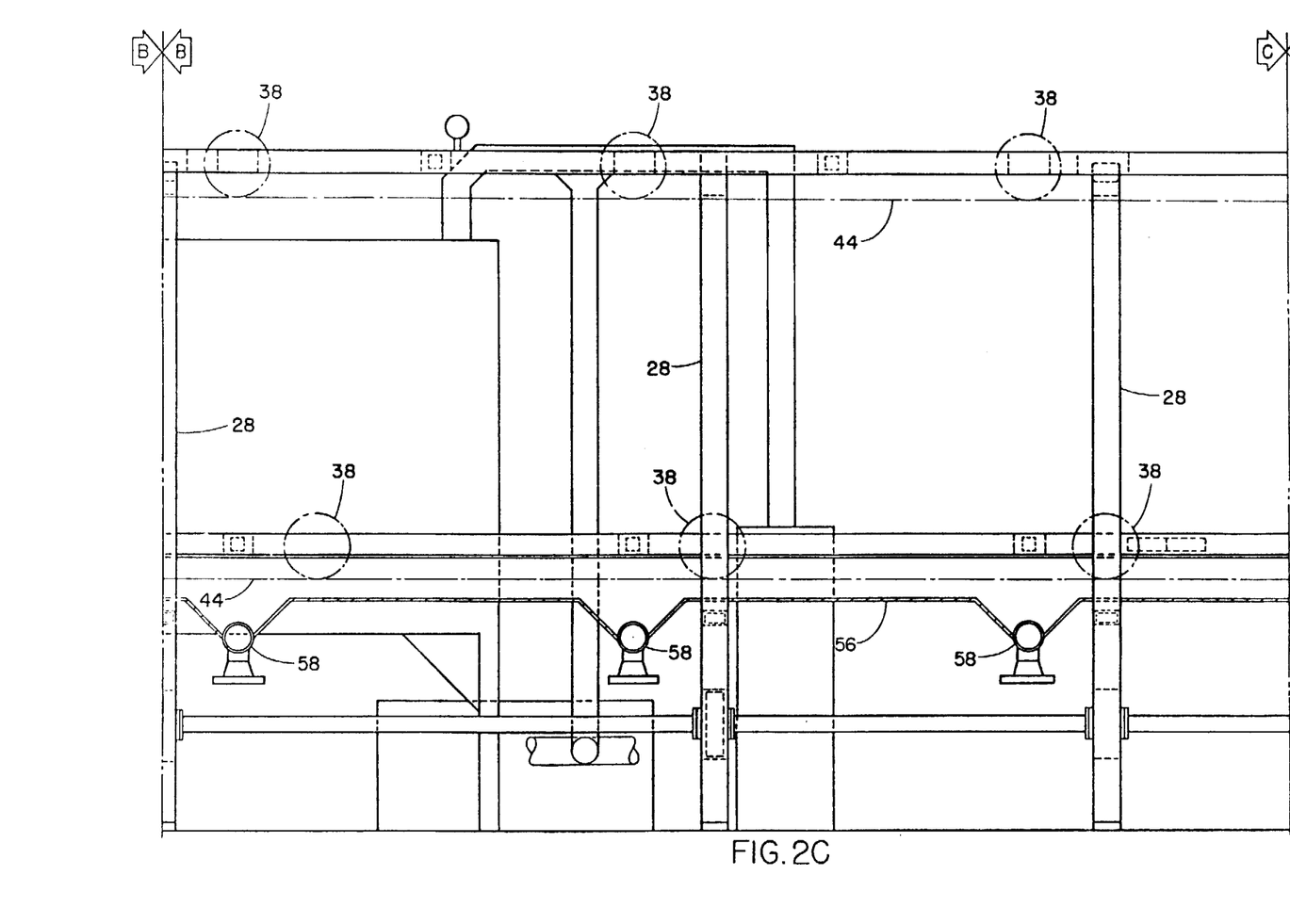
Figure 2D:
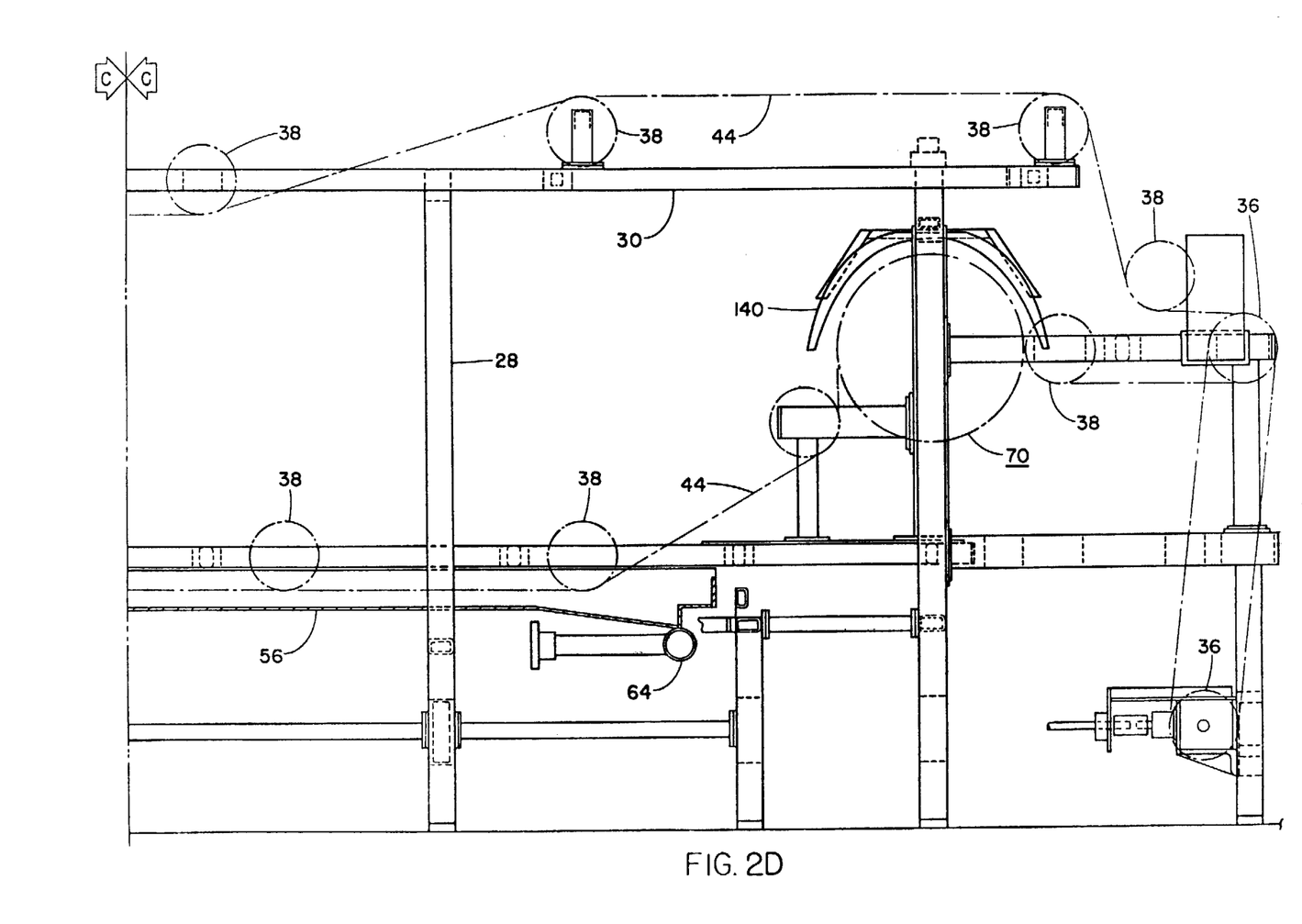
Figures 3, 4:
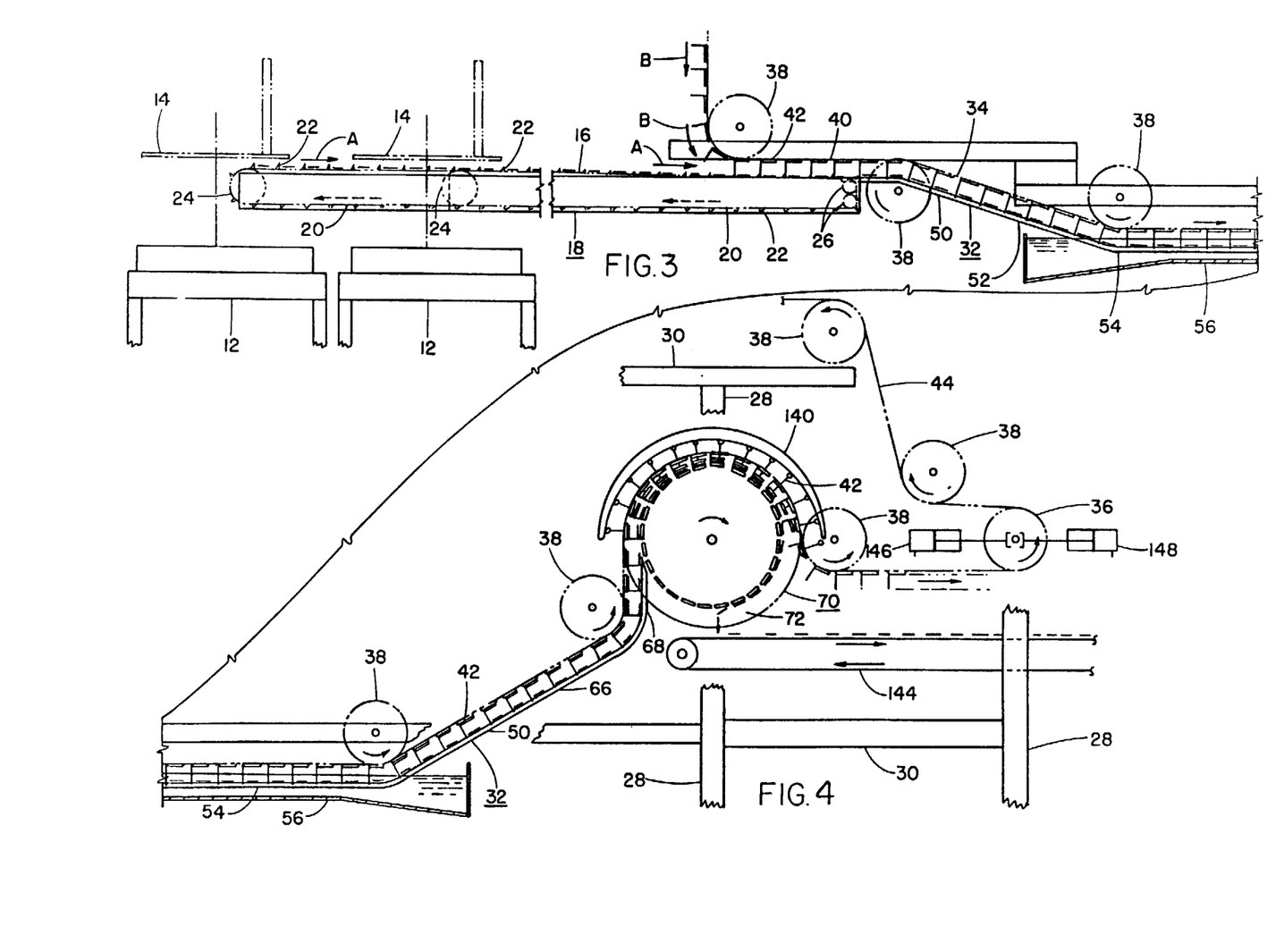
FIG. 3 is a generally schematic elevational side view of the inlet end portion of the apparatus showing further details of construction.
FIG. 4 is a view similar to FIG. 3 illustrating the output end of the apparatus including the forming die wheel.

Each production line of the machine 10 is provided with a slicing apparatus 12 adapted to continuously slice, in rapid sequence, strips of the bacon analog product from a vertically extending slab or bulk of the bacon analog material. Each slicing apparatus 12 may be of the rotary table slicing type manufactured by the Great Lakes Corporation; Chicago, Illinois, and sold under the trademark "Stackrite Slicer". Located in proximity to the dispensing end of the turntable 14 of the slicing apparatus 12 is the upper run 16 of a first endless conveyor arrangement 18, with the arrangement consisting of a plurality of adjacent parallel spaced belts 20. Some of the belts have upstanding lug members 22 projecting therefrom, spaced along the length of these belts adapted to engage the trailing edge of each of the bacon analog strips as they are dropped on the belts from the slicing machine 12 intermediate sequentially following lug members 22 so as to be conveyed along the upper run 16 of the conveyor arrangement in the direction of the arrow A as shown in FIG. 3 of the drawings. The conveyor arrangement is connected to a suitable motor drive (not shown) which will impart a predetermined speed of linear movement to the slices of bacon analog food product disposed on the belts. The motor drive may be mounted beneath the conveyor belts, the latter of which may be of an endless chain conveyor construction adapted to be driven by means of interengaging drive sprocket wheels 24, 26. The bacon analog strips are positioned in a lay-flat orientation on the conveyor belts, with the length of the strips extending transversely to their direction of conveyance. The free ends of the bacon analog strips extend laterally somewhat past the extreme end belts and suitable sensing means (not shown) may be provided for the ejection of strips not properly arranged on the conveyor belt arrangement.

Supported through the intermediary of upstanding columns 28 and horizontal beams 30 of a stationary frame structure of the machine is a second endless conveyor arrangement 32 consisting of belts, preferably endless sprocket chains 34, which are entrained over a series of suitable drive and guide sprocket wheels 36, 38, and which are driven at a speed in synchronism with the speed of the first conveyor arrangement 18 conducting the sliced bacon analog strips from the slicing machine 12. As the second endless conveyor arrangement has the belts thereof approach the discharge or downstream end of the upper run 16 of the belts of the first endless conveyor arrangement 18 as it travels in the direction of the arrow B as shown in FIG. 3 of the drawings, the lower run 40 thereof extends into closely spaced relation above the upper run 16 of the first conveyor and moves in parallel therewith at the same linear rate of speed. Mounted on belts 44 of the second endless conveyor arrangement is a sequence of spaced strip-engaging members 42, each of the members having depending pins 46, 48 projecting out of the plane of movement of the conveyor belts 44. The strip-engaging members 42 are described and illustrated in greater detail in connection with FIGS. 7 and 8 of the drawings.

As the upper run 16 of the first endless conveyor 18 approaches its bacon analog strip discharge end, the belt portions thereof which mount the upstanding lug members 22 engaging the trailing edges of the bacon analog strips supported on the upper run of the conveyor, incline downwardly in contrast with the adjacent belts which do not mount lug members so as to cause the lugs 22 to depend below the surface of the upper run 16 of the first conveyor arrangement thereby causing the strips to ride on the surfaces of the last-mentioned belts and disengage the trailing edges of the strips from the lug members. Concurrently, prior to the lug members being entirely disengaged from contact with the trailing edges of the strips, the strip trailing edges are contacted by at least some of the depending pins 46 mounted on the strip-engaging members 42 on the second endless conveyor arrangement, these pins interdigitating with the belts 20 of the first endless conveyor arrangement so as to conduct the strips in the same continuing direction of movement.

Commencing from the discharge end of the first endless conveyor arrangement 18, slightly below or on the same plane with the upper run 16 thereof, are a plurality of parallel spaced elongate guide rods 50, preferably of circular cross section, onto which the strips are conducted by the depending pins 46 on the strip-engaging members on the second endless conveyor, and conveyed therealong under the urging of the depending pins contacting the trailing edges of the strips. The guide rods 50 have a downwardly sloped portion 52 which extends into a horizontal run 54.

A cooking tank 56, which is of a generally shallow flat-bottomed configuration, extends below the horizontal run 54 of the guide rods 50 and contains hot cooking oil for the frying or cooking of the bacon analog strips to a desired degree of crispness in a controlled and uniform manner. As illustrated in FIGS. 3 and 4 of the drawings, the horizontal run of the guide rods 50 extends through the length of the tank 56 while submerged in the cooking oil, with the depending pins 46 which contact the trailing edges of the bacon analog strips conducting the latter through the tank. The hot cooking oil is introduced into the tank 56 at the bottom thereof through a plurality of spaced transversely arranged apertured inlet conduits 58 located at the central portions of the tank, and which are located in V-shaped troughs 60 transversely extending in the bottom of the tank. In order to prevent turbulent upward flow of the oil into the tank 56 from the conduits 58, which would cause the bacon analog strips to be displaced from their locations on the guide rods 50, arranged adjacent each inlet conduit, and extending the length of the trough, are a plurality of coiled springs 62 which form baffles for diverting the inflow of oil to the tank 56 into randomly oriented flow paths to thereby provide a laminar flow pattern. Outlet conduits 64 for the oil are provided at the upstream and downstream ends of the tank 56 so as to cause at least a portion of the oil conducted into the tank to flow in a countercurrent flow path relative to the direction of conveyance of the strips through the tank, and assuring that a uniform temperature will reign along the path of travel of the strips through the length of the entire cooking tank. The oil which is withdrawn through the outlet conduits 64 from the tank, if desired, may then be recirculated into the tank through the inlet conduits 58 after being strained and heated to the required frying or cooking temperature. The tank 56 may be provided with a hooded cover structure (not shown) which will prevent hot oil contained therein from splashing or spraying outwardly so as to possibly cause injury to personnel operating the machine.

Figure 7:
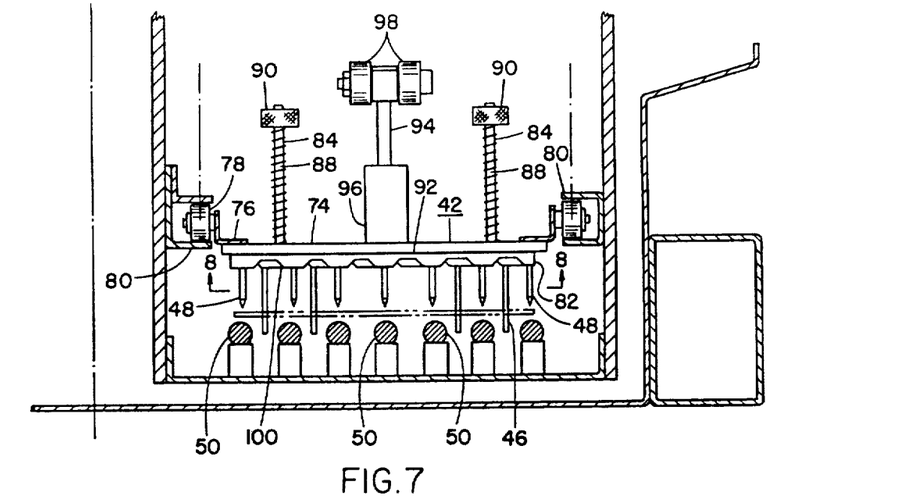
FIG. 7 illustrates, in an enlarged scale, a front view of a strip-engaging member interdigitating with guide rod members for the bacon analog strips, taken along line 7—7 in FIG. 3.
Figure 8:
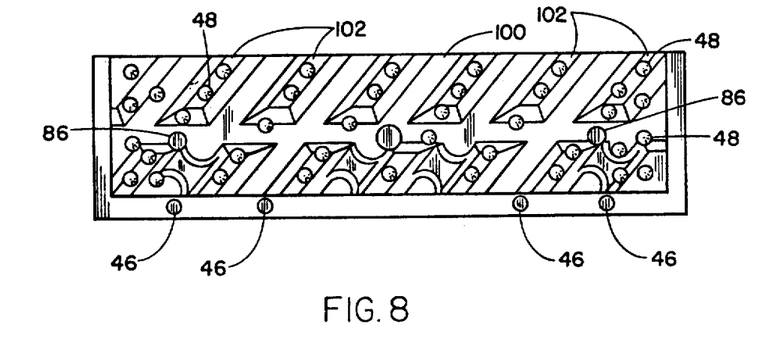
FIG. 8 is a view taken along line 8—8 in FIG. 7, further enlarged for purposes of constructional clarity.
Figure 9:
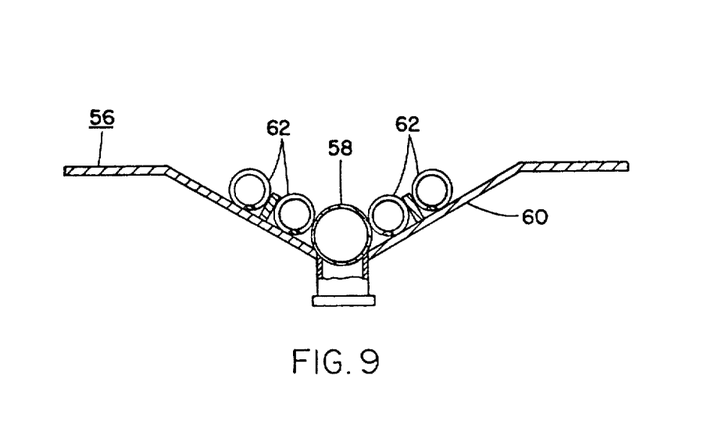
FIG. 9 is an enlarged detail view of the encircled area A—A in FIG. 2c.
Figure 10:
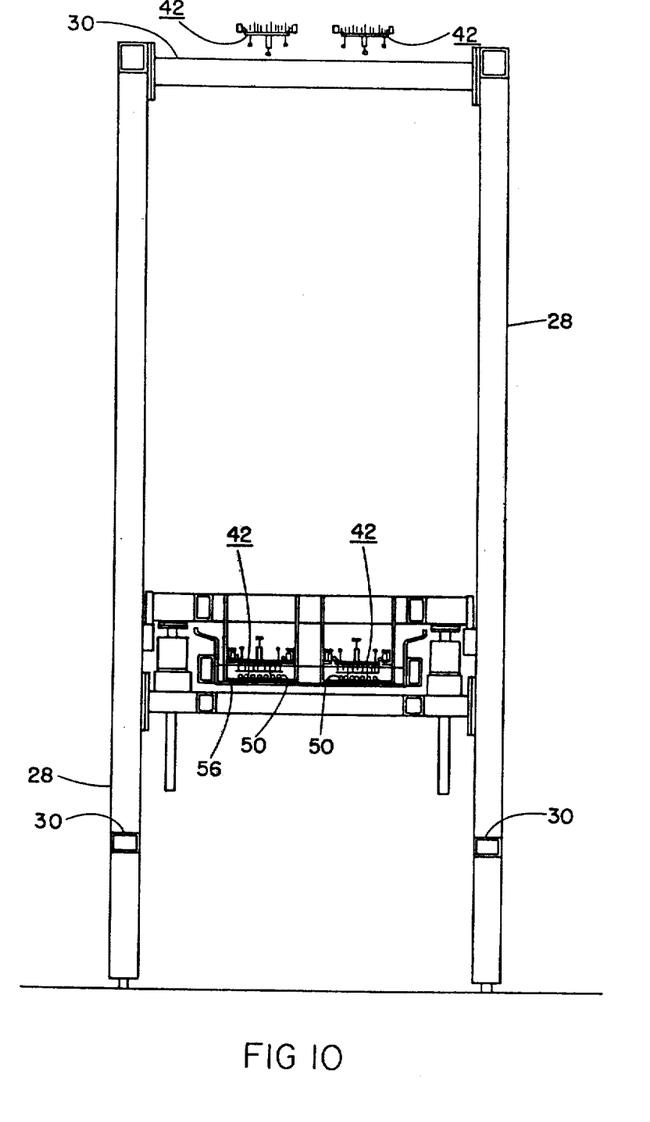
FIG. 10 is a vertical sectional view taken along line 10—10 in FIG. 2d.

Each of the strip-engaging members 42 which is fastened to the second endless conveyor arrangement, as shown in FIGS. 7 and 8 of the drawings, and is adapted to conduct the bacon analog strips from the first endless conveyor arrangement onto the guide rods, includes a generally flat plate 74 having brackets 76 fastened to each of the ends thereof which mount bearings 78 pivotally connected to the belts 44 of the second conveyor arrangement 32. Along the lower run 40 of the second conveyor arrangement, as the belts thereof pass in spaced relationship above the guide rods 50 extending through the tank 56, the members 42 are guided by means of guide brackets 80 fastened to side wall portions of the machine frame in order to control the vertical positioning of the strip-engaging members and their spacing above the guide rods 50. The plate includes a plurality of spaced depending pins 46, 48, of which a number of the pins 46 arranged in a row along the trailing edge thereof are longer than the remaining pins 48, so as to be able to interdigitate between the spaced guide rods 50 as the bacon analog strips are conducted therealong through the cooking tank 56. The shorter pins 48 each have pointed lower ends which are adapted to be contacted by the upper surface of the bacon analog strips in point contact during conveyance of the strips through the cooking tank 56 so as to leave essentially the entire surface of the bacon analog strips exposed to the hot, circulating cooking oil. In essence, this will permit practically the entire surface area on all sides of the bacon analog strips to be fully contacted by the hot cooking oil as the strips are conveyed through the tank 56, thereby allowing uniform cooking to be effected over the entire strip surface inasmuch as no large surfaces are in contact with the strips which may produce either localized hot spots causing burning or charring or which would prevent cooking oil from reaching those areas and result in the production of non-uniformly cooked or fried bacon analog strips.

Moreover, the shorter pins 48 serve the further function of aiding the bacon analog strips in maintaining their shapes as the latter are conducted through the cooking tank 56. This is accomplished by the points of the pins contacting the upper surface of the strips at various spaced locations, thereby inhibiting surface distortions of the strips as they are being cooked.

A second plate 82 is mounted below the first plate 74 of the strip-engaging member and is provided with through apertures rendering it slidable along the shorter pins. The second plate has a pair of upstanding rod members 84 mounted thereon which extend through apertures 86 formed in the first plate in a direction opposite to that of the pins, and are encompassed by spring members 88 which are held in place with adjustable compression through knurled nuts 90 threaded onto the free ends of the rod members in order to normally bias the second plate 82 into surface contact with the lower surface 92 of the first plate 74 and to permit the pins 48 to substantially fully project therefrom. A plunger rod 94 is mounted on the upper surface of the second plate 82 and extends through an apertured sleeve 96 fastened to the first plate 74, forming a plunger arrangement for displacing the second plate 82 downwardly along the pins 48 relative to the first plate. Suitable rotatable cam rollers 98 are mounted at the upper or free end of the plunger rod for depressing the latter in opposition to the biasing force of the spring members for a purpose to be described in detail hereinbelow. The other or lower surface 100 of the second plate 82 which faces towards the free ends of the pins 48 is provided with raised surface portions 102 extending diagonally thereacross in order to impart a generally undulating or wavilinear configuration to this surface of the plate 82 which, in essence, will constitute a forming die surface assisting in the molding or shaping of the bacon analog strips into their final configuration.

As the guide rods 50 on which the superimposed strips are conducted through the cooking oil in the tank reach the outlet end of the tank 56, the guide rods are curved upwardly into an inclined slope 66 and then vertically 68 into close tangential spacing with a forming die wheel assembly 70. The assembly 70 includes a rotatable forming die wheel 72 which is driven at a speed so that its peripheral surface has a velocity equal to that of the second endless conveyor arrangement 32 as the latter is guided in a curvilinear path closely spaced along the upper arcuate portion of the forming die wheel periphery, as shown in FIGS. 2 and 4 of the drawings for effecting the finish molding or shaping of the bacon analog strips into their final predetermined configuration.

Figure 5:
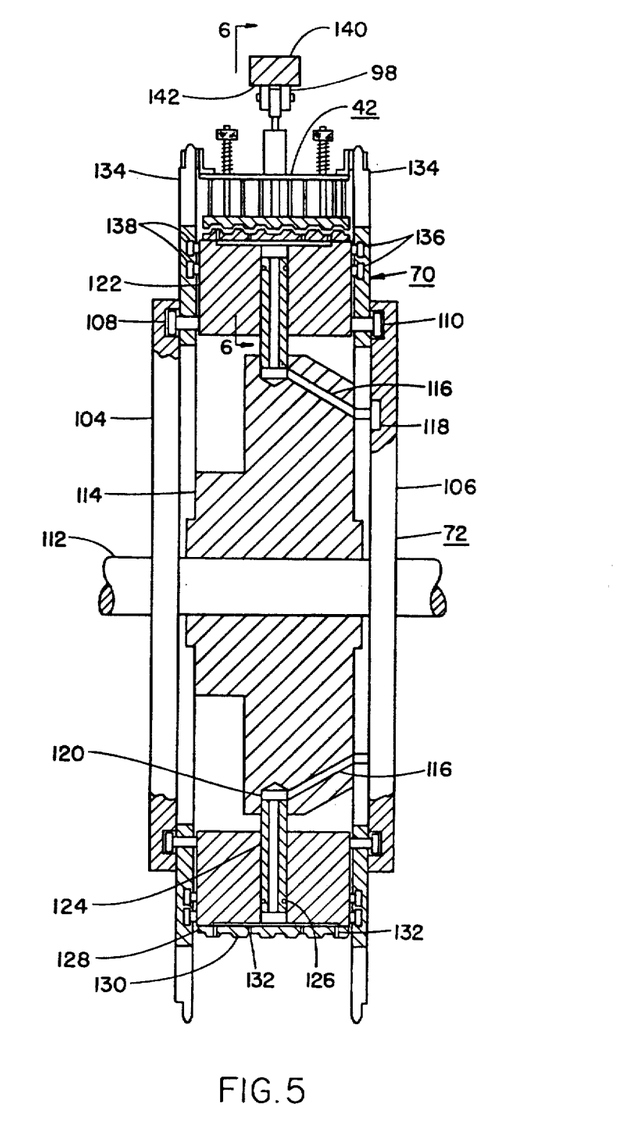
FIG. 5 illustrates, in an enlarged scale, a sectional view taken along line 5—5 in FIG. 4.
Figure 6:
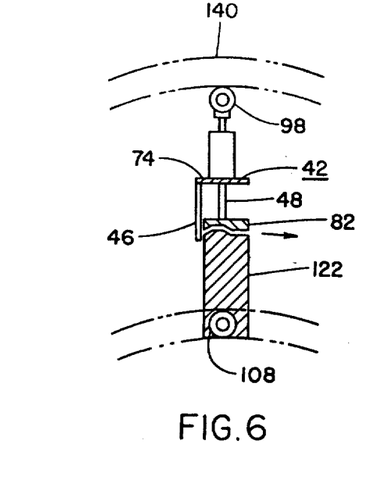
FIG. 6 is a fragmentary sectional view taken along line 6—6 in FIG. 5.

As illustrated in FIGS. 5 and 6 of the drawings, the rotatable forming die wheel 72 includes, for each bacon analog strip production line, a pair of spaced stationary cam plates 104, 106 each having inner cam grooves 108, 110 formed therein, and which are fastened to the fixed frame structure of the machine. Mounted on a rotatable drive shaft 112 for rotation therewith is a hub 114 having internal passageways 116 therein each selectively communicating at one end thereof with a source of vacuum or a pressurized air manifold (not shown) through recesses 118 provided in the cam plates and, at the other end, communicating with a plurality of radially extending bores 120 formed in the hub. A plurality of blocks 122 are mounted proximate the periphery of the forming die wheel 72 and communicate with the passageways in the hub through radially extending sleeve members 124 slidably supported in bores formed in the blocks and sealed against air leakage by means of suitable sealing gaskets 126. A pair of plates are arranged intermediate the blocks and the stationary cam plates, and extend radially outwardly thereof. Guide rollers extend axially out of the blocks into guide grooves formed in the plates. Mounted on the radially outer surface of each of the blocks is a forming die plate 128 having a radially outwardly facing surface 130 adapted to be located in face-to-face or complementary alignment with the forming die surface 100 on the second plate 82 on respectively one of the strip-engaging elements 42, and having a wavilinear or undulating configuration complementary to that of the wavilinear surface on the second plate forming die surface. A plurality of apertures 12 provided through the forming die plate 128 on the forming die wheel 72 communicate the vacuum and pressurized air manifold in a selective manner with the die forming surface thereof. A pair of end plates 134 extend at each side of the blocks, rollers 136 on the latter riding in annular grooves 138 formed in the end plates.

Extending in a predetermined varyingly spaced relationship about the upper portion or half of the periphery of the rotatable forming die wheel is a stationary cam track 140 adapted to have an inner camming surface 142 thereof engaged by the rollers or cam followers 98 on the plunger arrangement 94 located on each of the strip-engaging members 42.

In effect, by providing an appropriate varying spacing between the camming surface of the cam track and the cam followers or rollers on the strip-engaging members as the second endless conveyor arrangement transports the strips upwardly into position on the forming die surfaces of the forming die plates arranged about the periphery of the rotatable forming die wheel, the plunger rod will be depressed in response to the closing of the gap between the camming surface and the forming die wheel, as shown in FIG. 4, causing the second plate 82 to slide along the shorter pins 48 extending from the first plate 74 of the spring-engaging member 42 radially inwardly towards the forming die plates on the forming die wheel until the die surface 100 on the second plate reaches a predetermined closely spaced relationship with the forming die surface 130 on the oppositely located forming die surface on the periphery of the rotatable forming die wheel, such spacing between the die surfaces being somewhat wider than the thickness of the cooked bacon analog strip which is interposed between the two complementary forming die surfaces. The extent of inward movement of the second plate 82 along the shorter pins 48 in response to the camming action of the plunger arrangement 94 is dimensioned so as to cause the free ends of the pins to completely recess within the plate 82 as the latter approaches the forming die surface 130. This will effectively remove any contact between the pins 48 and the bacon analog strip and eliminate adherence of the strips to the ends of the pins. This interaction of the forming die surfaces will mold the bacon analog strip arranged therebetween into its predetermined finished configuration as the strip is being cooled while being transported further in response to the rotation of the forming die wheel 72.

As the camming surface 142 allows the cam follower 98 to lift the plunger 94 under the urging of the compression springs 88 and, as a result, the second plate providing the forming die surface on each of the strip-engaging members, away from the complementary forming die plate on the wheel, a vacuum or suction air is applied through a manifold to the surfaces 130 of the forming dies 128 arranged on the rotatable forming die wheel over a predetermined angular displacement of the latter, thereby retaining the finish molded and cooling strips in engagement with the forming dies on the forming die wheel 72. As the strips are being rotated downwardly towards the bottom of the wheel, this will prevent adherence of the finish molded bacon analog strips to the pins 48 of the strip-engaging members 42 when the latter are being withdrawn from the forming die wheel by a change in direction of the second endless conveyor arrangement 32. Thereafter, as the strips are conducted towards the bottom dead center of the forming die wheel 72, the suction air or vacuum retaining the strips to the forming die plate surfaces is lifted shortly prior thereto, and pressurized air is applied through the manifold passageway for an extremely short time interval so as to eject the finished strips downwardly from the forming die plate and away from the wheel, and deposit the strips on a suitable belt conveyor 144 which will conduct the strips towards another operating station (not shown) for further processing and/or packaging. The second endless conveyor arrangement then is directed upwardly, through the intermediary of suitable sprocket guide rollers 38 and sprocket drive wheels 36, to above the machine and returned towards the inlet end of the tank 56 and into cooperative engagement with the bacon analog strip discharge end of the first endless conveyor arrangement 18.

In order to ensure that the appropriate degree of tension is imparted to the lower run of the second endless conveyor arrangement as the strip-engaging members 42 are conducted through the cooking tank 56 and into cooperation with the forming die plates 128 on the forming die wheel 72, a pair of oppositely acting hydraulic or pneumatic pressure cylinders 146 and 148 are connected to the shaft mounting the sprocket drive wheels 36, as shown in FIG. 4 of the drawings. The shaft is supported in the machine frame so as to be horizontally movable, thereby permitting variable tension to be applied to the lower run of the second endless conveyor arrangement through adjustment of the differential pressure applied to the shaft of wheels 36 by the pressure cylinders 146, 148.

The operation of the machine, as described with regard to a single production line, is essentially as follows:

At the slicing end of the machine 10, slabs of the semi-processed bacon analog food product, which have been laminated to simulate the coloring of the natural bacon, are positioned in a substantially vertical manner in an upright support device on the slicing apparatus 12 above a horizontal rotating plate which is concentrically rotatable in conjunction with a slicing arrangement 14 similar to a meat slicer. The present machine as contemplated comprises two parallel endless conveyor arrangements 18 to provide for the simultaneous processing of two production lines of bacon analog strips. Upon the bacon having been sliced into individual strips, approximately 1¼" wide by 4½" long and ⅛" thick, it is deposited transversely oriented in sequential order on the upper horizontal run 16 of the first conveyor arrangement 18 interposed between successive spaced upright lugs 22, which will convey the bacon analog strips to approximately a few feet ahead or upstream of the inlet to the cooking tank 56. The conveyor belts 20 which transport the bacon analog strips from the slicing machine interdigitate proximate the discharge end thereof with strip-engaging members 42 spaced along the second endless conveyor arrangement 32 extending over the length of the cooking tank. On the second conveyor arrangement, the strip-engaging members each include depending lengthy pins 46 for contacting the trailing edges of the bacon analog strips and to continue transport thereof at the discharge end of the first conveyor arrangement, as the latter has the belts mounting the upright lugs depend below the support plane for the strips so as to disengage from the strips, as the latter are contacted by the pins 46 on the strip-engaging members 42. Thereafter, the pins conduct the bacon analog strips onto the guide rods 50 in a downwardly inclined path and thereafter horizontally into and through the tank 56 containing hot cooking oil.

Each of the strip-engaging members 42 has the forming die plate 82 which is slidable on the pins 48 in its uppermost position remote from contact with the bacon analog strips, the latter of which are contacted by the lower free ends of the shorter pins 48. The cooking tank 56, consists essentially of a plurality of trough sections, into which the boiling cooking oil, at a temperature of preferably approximately 350° F., is pumped through apertured conduits in the bottom of the troughs at the central portions thereof so as to cause the hot oil to flow towards each end, in effect, partially in countercurrent flow towards the inlet end of the tank and partially towards the outlet end for the strips, wherein there are provided the outlet conduits for recirculating and reheating the cooking oil. In order to assure that the oil flows into the tank in a laminar manner, coiled springs are provided at the bottom of the troughs adjacent the inlet ducts. Proximate the inlet end of the cooking tank, the bacon analog strips are submerged in the oil and conveyed therethrough at a depth of approximately 2" below the surface thereof. The strips tend to sink in the oil, being of a somewhat greater density than the latter, and are prevented from sinking to the bottom of the oil tank by means of the plurality of parallel guide rods 50 on which they are supported as they are conducted through the tank by means of the pins 46.

As the oil fries or cooks the bacon analog strips, the latter become less dense as the moisture therein is evaporated, and finally tend to rise upwardly so as to float into contact with the bottom points of the pins 48. The speed of the second endless conveyor arrangement with the strip-engaging members mounting the pins is adjusted so that the bacon analog strips are passed through the length of the cooking tank and the oil therein over a predetermined period of time so as to impart a finished degree of crispness thereto, in effect, process the strips into a ready-to-eat condition. Preferably, the top of the cooking tank 56 is maintained in a covered condition so as to prevent the splashing out of hot cooking oil and to reduce the risk of fire or injury to operating personnel.

As the strips emerge from the outlet end of the cooking tank, the path of movement of the strips is upwardly inclined by means of the guide rods 50 which, as the bacon analog strips are raised out of the hot oil, will allow any excess oil to drip downwardly and run off into a suitable oil-collecting vessel. Adjacent the outlet end of the upwardly inclined section of the guide rods is the forming die wheel assembly 70 which will impart the final molded configuration to the fried bacon analog strips. The second endless conveyor arrangement is arced so as to move practically vertically upwardly and convey by means of the pins 46, the bacon analog strips along the guide rods, the latter of which are also curved upwardly in conformance with the direction of the conveyor arrangement. Thereafter, the guide rods on which the bacon analog strips are supported terminate tangentially to the periphery of the rotating forming die wheel 72. The forming die plate 82 on the strip-engaging member, in response to inward movement or depression of the plunger arrangement 94 caused by the rollers 98 contacting the camming surface 142 extending about the upper portion of the forming die wheel periphery, will cause the forming die plates on each of the strip-engaging members 42 to move radially inwardly towards the forming die wheel, concurrent with the forming die plates 128 being cammed radially outwardly, stripping the bacon analog strips off the ends of pins 48 and thereby positioning the strips against forming die plates 128 mounted along the outer peripheral surface of the forming die wheel and opposite those on the strip-engaging members. The reason for imparting radial displacements to both the outer and inner forming die members 42 and 128 is to coordinate their movements so as to cause them to come into their cooperatively acting positions in a substantially parallel manner. The predetermined spacing and wavilinear patterns present between the forming dies will impart the final natural bacon-like wavy configuration to the bacon analog strips. As the strip-engaging members are conducted around approximately 180° of the forming die wheel, they are withdrawn therefrom by having the second endless conveyor extend horizontally outwardly and upwardly above the machine to thereby return to the discharge end of the first endless conveyor leading from the slicing unit as previously described. The horizontal movement of the conveyor away from the forming die wheel will permit any residual oil adhering to the endless conveyor arrangement to drip down into a suitable oil-collecting pan from whence the oil is either returned directly to the cooking oil in the tank or recycled through a cleaning unit.

As the cooperating forming dies 82, 128 are moved apart, the molded bacon analog strips, which have now been molded to their finished configuration and concurrently cooled, remain adherent to the forming dies on the forming die wheel through a vacuum or suction air being applied to the dies until reaching almost the bottom position on the wheel. In addition to providing for adherence of the bacon analog strips to the forming dies on the forming die wheel, the suction air serves the important purpose of controlling the fat content of the strips by aspirating some excess fat or oil from the surface of the strips. This, in effect, will cause the oil content of the bacon analog strips to be maintained constant and within predetermined parameters. Closely thereafter, the suction air will be cut off or the vacuum removed and replaced by a short burst of pressurized air in order to eject the bacon analog strips from the surface of each forming die reaching that location, and cause it to drop onto a belt conveyor for transportation towards a packaging installation.

Although the machine and operation thereof has been described with reference to a single production line, although illustrated with two such lines, each of which is connected to a separate slicing apparatus for producing the bacon analog strips, the machine would be equally applicable for use with a single production line, three, four, or possibly even more production lines, by simply incorporating additional operating sections and parallel endless conveyor arrangements.

Additionally, the production of the machine can be increased by threefold, for example, by causing the pins or strip-engaging members to traverse the cooking tank in three overlapping passes, namely, by having the bacon analog strips pass through the oil over a distance of 90 feet rather than the 30 feet contemplated for the machine. Since time would thus be cut to one-third, the machine can be operated three times as fast, thereby theoretically increasing production threefold.

The entire machine is mounted on a steel frame construction, which may include hydraulic units or jacks for elevating portions thereof, particularly those relating to the conveyor arrangements and the tank, to facilitate cleaning and other servicing. Suitable compressors may be provided for selectively supplying suction air and pressurized air to the forming die wheel. Preferably, all components of the machine are formed of stainless steel to minimize any possibility of corrosion. The oil is changed periodically in accordance with need and prevailing health standards.

Suitable guide wheels may be located adjacent the run of the first endless conveyor arrangement as the bacon analog strips are being transported thereon from the slicing unit towards contact with the pins, so as to assure that the strips are laterally aligned for central positioning on the conveyor run.

Additionally, if desired, sensors may be provided to operate in cooperation with the first endless conveyor arrangement which, depending upon the amount of sag of the end portions of the strips on the conveyor belts, will sense whether these strips are either defective or misplaced so as to cause them to be ejected therefrom and thereby to eliminate the possible jamming of the machine.

Furthermore, the apparatus as disclosed herein may be utilized without a forming die wheel for effecting the finish shaping or molding of the cooked bacon analog strips. Thus, the first and second endless conveyor arrangements may convey the bacon analog strips from the slicing end of the machine into and through the cooking tank, and thereafter into some suitable apparatus (other than the forming die wheel) for final molding and/or processing. This would then eliminate the necessity for provision of the forming dies on the strip-engaging members and only require the pins for conducting the bacon analog strips through the cooking tank.

Alternatively, the forming die wheel assembly can be employed without the first and second endless conveyor arrangements for the bacon analog strips. Essentially, the cooked bacon analog strips can be conveyed to or positioned on the forming die wheel assembly through any suitable arrangement, either manually or automatically, and in a sequential manner and finish molded thereon through cooperating forming dies.

Thus, the first and second endless conveyor arrangements, and the forming die wheel assembly may constitute independently operating integers of a system adapted to the processing of cooked bacon analog strips.

Although the machine has been described with regard to a single conveyor production line, it is quite readily apparent, as shown in FIGS. 1a through 1d and 2a through 2d, that the machine consists of two simultaneously operating parallel spaced conveyor production lines, and that although in FIGS. 5 and 6 only a single production line forming wheel has been shown, a similar second forming die wheel for an adjacent and parallel operating conveyor production line may be positioned on the shaft and operated concurrently with the first line. Moreover, it is also readily understandable that the machine may be operated with more than two production lines, for example, three, four, or a greater number of parallel spaced conveyor systems.

What is claimed is:

1. An apparatus for the molding of generally ready-to-consume friable or fragile food product strips having a predetermined configuration, such as a bacon analog or the like, from cooked strips of said food product comprising a plurality of guide rods; a series of strip-engaging members along said guide rods for sequentially conveying said food product strips; a plurality of first forming die means for said cooked strips being arranged on said strip-engaging members; a rotatable forming die wheel for said cooked strips; a plurality of second forming die means being mounted on the periphery of said forming wheel each adapted to receive respectively one of said cooked strips from said first forming die means; and means for operatively associating said second die means with a first forming die for conjointly molding said strips into their finished configurations; and further comprising first camming means having a camming surface extending in predetermined spaced relationship about a portion of the periphery of said rotatable forming die wheel for imparting radial movement to said first forming die means towards an associated second forming die means on said forming die wheel.

2. An apparatus as claimed in claim 1, comprising second camming means in said forming die wheel for imparting radial movement to said second forming die means arranged on the periphery of said wheel.

3. An apparatus as claimed in claim 2, comprising suction air means on said forming die wheel communicating with said second forming die means and providing a vacuum for retaining said strips in contact with said second forming die means over a predetermined angular rotation of said wheel; and pressurized air means for ejecting said strips from said second forming die means subsequent to release of said vacuum upon said strips reaching a predetermined position proximate the bottom of said forming die wheel.

4. An apparatus as claimed in claim 3, said first and second forming die means each comprising plates having complementary contoured die surfaces adapted to mold said strips into predetermined wavilinear configurations upon said die plates being brought into a cooperative relationship responsive to displacement thereof by said first and second camming means, said suction air means and said pressurized air means including passageways in said forming die wheel communicating with the strip-contacting surfaces of said contoured die plates on said second forming die means.

5. An apparatus as claimed in claim 2, said second camming means on said forming die wheel comprising a pair of spaced cam plates; cam grooves formed in said cam plates; means intermediate said cam plates mounting said second forming die means; cam follower rollers axially projecting from said mounting means and engaging in said cam grooves for imparting predetermined radial movement to said second forming die means.

6. An apparatus as claimed in claim 5, comprising a hub member on said forming die wheel; radially extending conduit means interconnecting said forming die mounting means and said hub member, said mounting means being radially movable relative to said conduit means; and passageways formed in said forming die mounting means and hub member communicating through said conduit means with said second forming die means adapted to be selectively connected to a source of suction air and pressurized air for selectively supplying a source of vacuum or pressurized air to said second forming die means.

7. An apparatus as claimed in claim 6, comprising passageways in said second forming die means for selectively connecting the strip-contacting die surface thereof with said source of vacuum and pressurized air.

* * * * *